United States Patent [19]

La Fetra

[11] Patent Number: 5,509,119
[45] Date of Patent: Apr. 16, 1996

[54] FAST COMPARISON METHOD AND APPARATUS FOR ERROR CORRECTED CACHE TAGS

[75] Inventor: Ross V. La Fetra, Cupertino, Calif.

[73] Assignee: Hewlett-Packard Company, Palo Alto, Calif.

[21] Appl. No.: 311,478

[22] Filed: Sep. 23, 1994

[51] Int. Cl.$^6$ .................................................. G06F 11/34
[52] U.S. Cl. ............................ 395/185.05; 395/185.06; 364/243.41; 364/964.2
[58] Field of Search ........................ 395/575, 183.01, 395/183.16, 183.17, 180, 185.05, 185.06; 364/243, 243.4, 243.41, 964, 964.2; 371/67.1, 68.1, 68.3

[56] References Cited

U.S. PATENT DOCUMENTS

| | | | |
|---|---|---|---|
| 4,862,462 | 8/1989 | Zulian | 371/38 |
| 4,995,041 | 2/1991 | Hetherington et al. | 371/40.1 |
| 5,233,616 | 8/1993 | Callander | 371/37.7 |
| 5,251,310 | 10/1993 | Smelser et al. | 395/425 |
| 5,287,512 | 2/1994 | Ellis | 395/425 |

Primary Examiner—Robert W. Beausoliel, Jr.
Assistant Examiner—Trinh L. Tu
Attorney, Agent, or Firm—Howard R. Boyle

[57] ABSTRACT

A fast cache hit detection method and apparatus. The present invention provides a method and apparatus for quickly determining whether there is a cache hit in cache memory systems utilizing error corrected tags. The hit detection process is split into two paths. The first path includes a circuit to check and correct a tag stored in the cache memory. The second path tests the validity of the tag stored in the cache memory by computing the appropriate ECC information using memory address information supplied by the computer CPU and comparing the tag and ECC stored in the cache memory to the CPU address and computed ECC. As the computed ECC is performed in parallel with the cache RAM access, this second path provides hit confirmation faster than the first path which must process the tag and ECC stored in the cache RAM through a ECC check and correction circuit. If a fast hit is confirmed, then the cache memory system can proceed to supply cache data to the CPU. If a fast hit is not confirmed, then the cache memory system waits for the first path to check and correct, if required, the tag stored in the cache and then test the corrected tag. As the cache tag typically does not need correction and most cache systems have a high hit rate, this invention dramatically increases the efficiency of the cache memory system.

8 Claims, 4 Drawing Sheets

FAST COMPARISON METHOD AND APPARATUS FOR ERROR CORRECTED CACHE TAGS

FIELD OF THE INVENTION

The present invention relates to the design of computer systems incorporating cache memory systems and more particularly to quickly detecting whether needed information is in the cache memory—a cache hit—.

BACKGROUND

Most modern computer systems include a central processing unit (CPU) and a main memory. The speed at which the CPU can decode and execute instructions and operands depends upon the rate at which the instructions and operands can be transferred from main memory to the CPU. In an attempt to reduce the time required for the CPU to obtain instructions and operands from main memory many computer systems include a cache memory between the CPU and main memory.

A cache memory is a small, high-speed buffer memory which is used to hold temporarily those portions of the contents of main memory which it is believed will be used in the near future by the CPU. The main purpose of a cache memory is to shorten the time necessary to perform memory accesses, either for data or instruction fetch. The information located in cache memory may be accessed in much less time than information located in main memory. Thus, a CPU with a cache memory needs to spend far less time waiting for instructions and operands to be fetched and/or stored.

A cache memory is made up of many blocks of one or more words of data. Each block has associated with it an address tag and other information that uniquely identifies which block of main memory it is a copy of. Each time the processor makes a memory reference, an address tag comparison is made to see if a copy of the requested data resides in the cache memory. If the desired memory block is not in the cache memory, the block is retrieved from the main memory, stored in the cache memory and supplied to the processor. An address tag is often a subset of the address bits. For example, if the computer uses 32 address bits, the tag may, in a simple implementation, consist of the upper 12 bits.

In addition to using a cache memory to retrieve data from main memory, the CPU may lo also write data into the cache memory instead of directly to the main memory. When the processor desires to write data to the memory, the cache memory makes an address tag comparison to see if the data block into which data is to be written resides in the cache memory. If the data block exists in the cache memory, the data is written into the data block in the cache memory. In many systems a data "dirty bit" for the data block is then set. The dirty bit indicates that data in the data block is dirty (i.e., has been modified), and thus before the data block is deleted from the cache memory the modified data must be written into main memory. If the data block into which data is to be written does not exist in the cache memory, the data block must be fetched into the cache memory or the data written directly into the main memory.

In normal operation there are several different actions that may be necessary to satisfy some memory reference. A memory reference is generally a load or store instruction. First, simplest, and fastest, the reference might hit in the cache. A hit is defined as when the data for a desired memory address is present in the cache being checked (there may be multiple levels of cache). A miss is defined to be a memory reference where the data for a desired memory address is not present in the cache being checked. When there is a hit in the cache, the associated memory instruction is completed without any additional processing penalty.

The slowest operation is when the memory reference misses the cache. In this instance, a long sequence of operations is initiated to bring the relevant line from main memory into the cache. When this data is returned from memory and copied into the cache, the cache is again referenced, resulting, this time, in a hit and subsequently the requested data is supplied to the processor, or the store operation completes. This requires a considerable amount of time and represents a significant processing penalty.

Often, cache memories are direct mapped. That is, an index is used to access one of a plurality of entries in the cache. The tag for the entry is then compared with the tag portion of the address to determine whether a match (a hit) has occurred.

The prior discussion is presented as an overview of the field of the invention. Cache memory systems are well known and for a general discussion of cache systems, see for example, David A. Patterson, John L. Hennessy, Computer Architecture A Quantitative Approach, Morgan Kauffman Publishers, Inc., San Mateo, Calif., 1990, pp. 404 through 423 and 454 through 464.

Since cache address tags are stored in a RAM device, there is the possibility that the RAM data can become corrupted due to the many failure modes of memory devices. To prevent catastrophic results from such a memory failure, some computer systems are designed such that all address tags have an error correcting code (ECC) associated with them. The computer reads an address tag and its associated ECC from the cache memory, then checks and corrects (if required) the address tag before the tag is used.

With CPU clock speeds now in the 130 MHZ range, the time taken to check the cache address tag represents a significant time delay in the processing process. Also, since a good cache design yields a high percentage of "hits" and errors are infrequent, the cache address tag seldom has to be corrected and the delay time through the correction circuit unnecessarily penalizes almost every memory cycle.

What is needed in the industry is a cache hit detection method and apparatus that quickly determines when a cache hit occurs without sacrificing the integrity of the cache memory system.

SUMMARY OF THE INVENTION

The present invention provides a method and apparatus which detects an uncorrupted cache hit without waiting for the cache tag to be error corrected. In this manner, the additional delays required for error checking and correcting the cache tag do not penalize every memory cycle. Instead, only memory cycles which do not hit, or need to be error corrected, are delayed by the tag checking and correcting circuitry.

This novel apparatus splits the cache "hit" detection process into two paths, a fast hit detect path and a normal corrected hit detect path. The fast hit path generates the appropriate ECC (CPU-ECC) for the address tag being asserted by the CPU (CPU-Tag). Simultaneously, the contents of the cache RAM (Cache-Tag) associated with the CPU-Tag is accessed along with its associated ECC (Cache-ECC). The Cache-tag and Cache-ECC are compared to the CPU-Tag and CPU-ECC respectively. If both tags and both ECCs match, then a fast hit is asserted.

If the CPU and Cache tags do not match or the CPU and Cache ECCs do not match, then the fast hit is not asserted and the cache memory system waits until the Cache-Tag is checked and corrected, if required, by the tag check and correction circuitry. Then the checked/corrected Cache-Tag is compared against the CPU-Tag to detect a cache hit.

Since most of the time the Cache-Tag is error free and the required information is in the cache memory system, this novel method and apparatus eliminates the checking and correcting delays for the vast majority of memory cycles.

DETAILED DESCRIPTION OF THE INVENTION

In the following description of the invention, numbers will be used to refer to specific features or areas. The first numeral in a three digit number refers to the first drawing that reference number is used in.

As previously discussed, the cache memory is a small and fast random access memory (RAM) having a plurality of storage locations. The access time for cache memories is typically about 9 ns. Stored in the cache memory are a number of Tag-ECC pairs and associated with each Tag entry is a data storage location not relevant to this invention.

Figure 1:
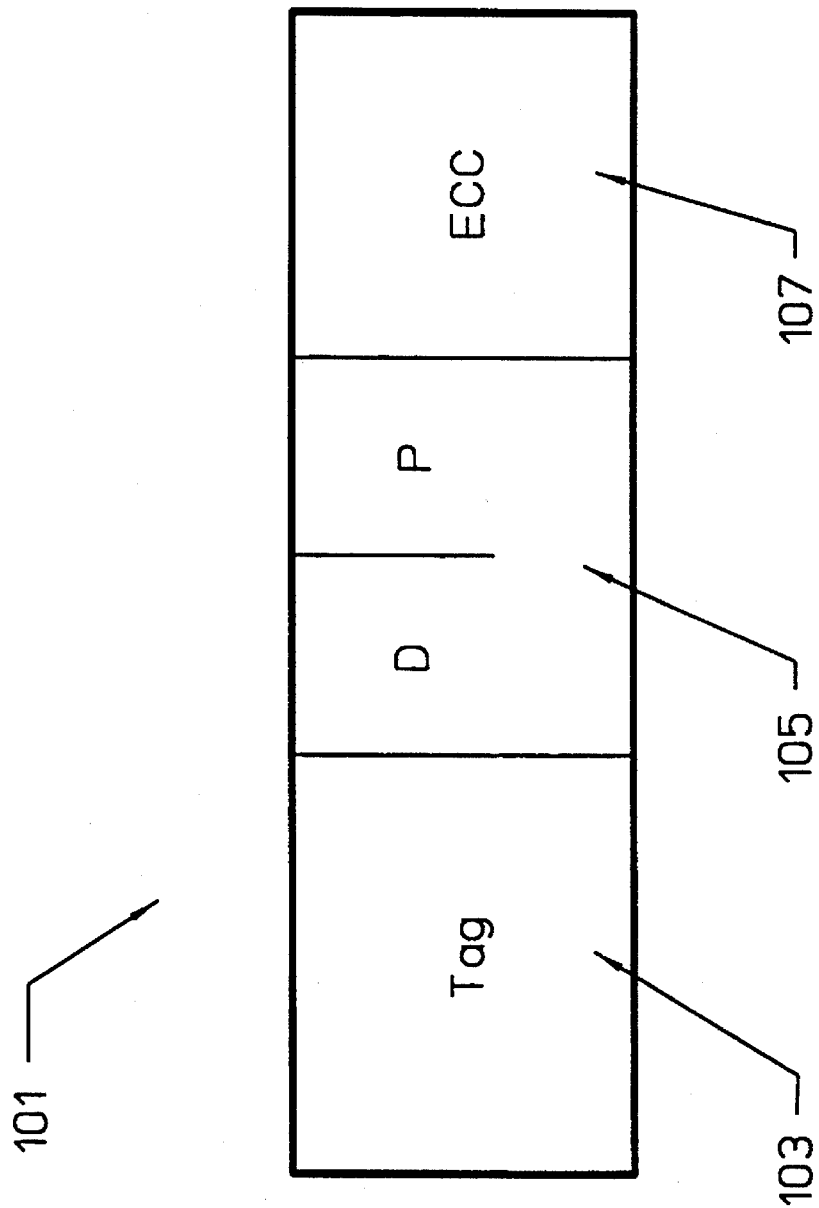
FIG. 1 illustrates a typical cache RAM entry.

FIG. 1 illustrates a typical cache Tag-ECC entry 101 having three primary segments 103, 105 and 107. Segment 105 contains "house keeping" information such as bits that indicate the cache is "dirty" or "private". The ECC field 107 has error correcting data for both the Tag segment 103 and the house keeping segment 105.

Figure 2:
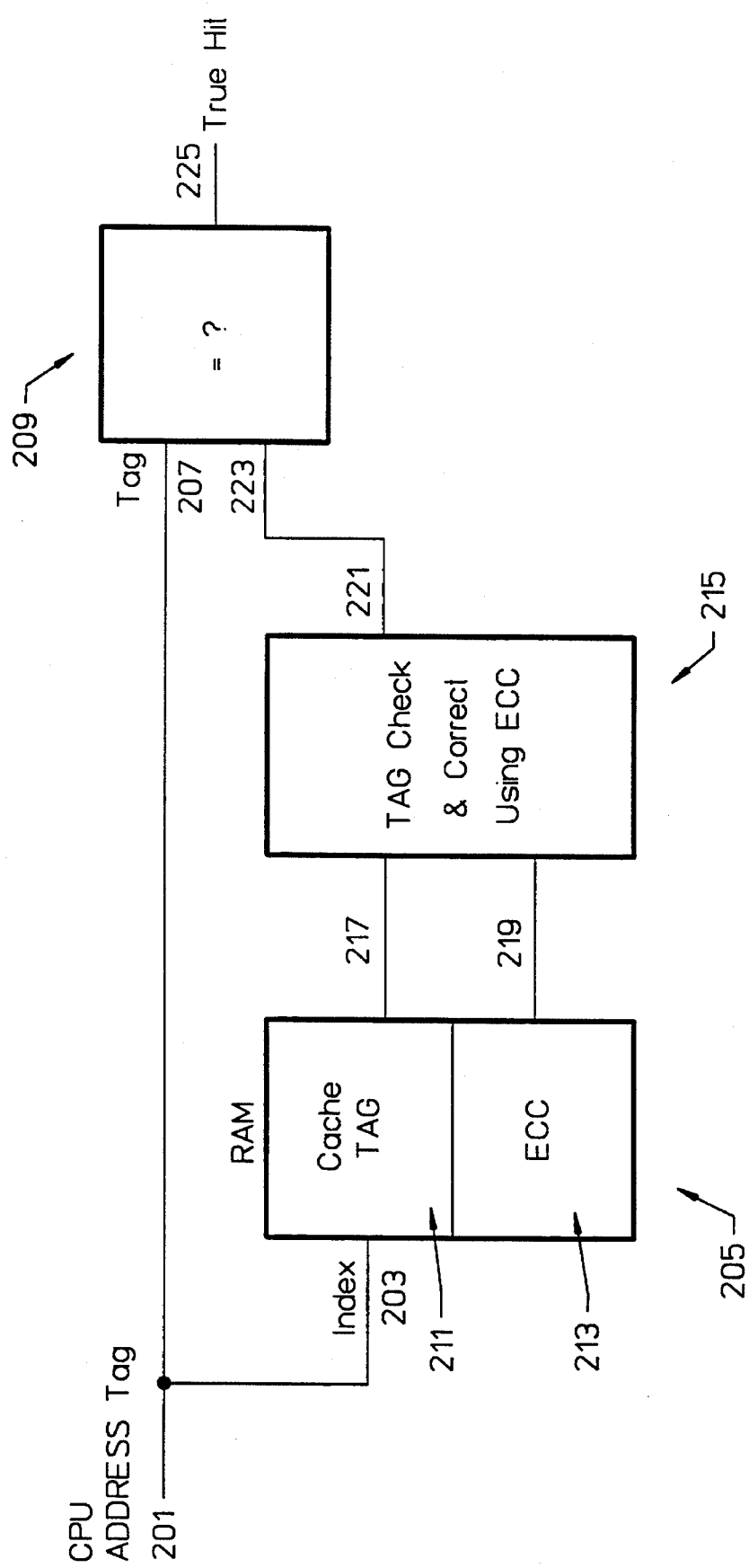
FIG. 2 illustrates a simplified prior art cache hit detection apparatus.

FIG. 2 illustrates a simplified prior art cache hit apparatus. A CPU (not shown) asserts a CPU address Tag 201 which provides an index input 203 to a cache RAM 205 and a Tag input 207 to a Tag comparator 209. A Cache-Tag and ECC pair 211 and 213, respectively, are stored in the cache RAM 205. A Tag check and correct circuit 215 has a Cache-Tag input 217 and a Cache-ECC input 219. The Tag check and correct circuit 215 also has a corrected Tag output 221 which provides a corrected Tag input 223 to the Tag comparator 209. A true hit output 225 is provided from the Tag comparator 209.

In operation, the CPU address Tag 201 is asserted by a CPU. The CPU-Tag is fed into the Tag input 207 of the comparator and simultaneously fed into the index input 203 of the cache RAM 205. The index input is the address input of the cache RAM. The cache RAM then outputs the Cache-Tag and the ECC information 213 associated with the memory location in the cache RAM addressed by the index input. In this example, Cache-Tag 211 and its associated ECC 213 are presented on the outputs of the cache RAM and fed into the inputs 217 and 219 respectively of the Tag check and correct circuit 215.

The Tag check and correct circuit 215 checks the Cache-Tag for errors using the ECC information and corrects the Cache-Tag if an error is found. This checked and corrected Tag is then presented on the output 221 of the circuit and fed to the corrected Tag input 223 of the Tag comparator 209. After the corrected Tag is available to the Tag comparator 209, the comparator compares the corrected Tag to the CPU-Tag and if the two Tags match, the comparator outputs a true hit signal on output line 225. This signal is used by the cache memory system to provide data in the cache memory to the CPU by methods known in the art. If the two Tags do not match, then there has been a cache miss and the cache is updated as previously discussed. In this illustrative example only one Cache-Tag is shown stored in the cache memory. However in practice many such Tags would be stored in the cache memory and the index input would select which Tag and ECC information is presented to the Tag check and correct circuit.

The elapsed time from the time the CPU-Tag is asserted until the true hit output 225 is valid varies according to the technology used to manufacture the cache RAM and the Tag check and correct circuit. However the check and correct process typically takes about ⅓ the time as it takes to access the Cache-Tag from the cache RAM. So assuming a 7ns cache RAM, the Tag check and correct circuit will take about 2ns to check and correct the Cache-Tag accessed from the cache RAM. Therefore approximately 9ns will elapse from the time the CPU-Tag is asserted until the true hit output is valid. Considering that a CPU cycle is only about 7–8ns, this delay through the cache memory system is problematic for today's high speed CPUs.

Given an address asserted by the CPU (CPU-Tag), the information that must be in the cache entry 101 for a cache hit to occur is predictable. That is, the Cache-Tag must match the CPU-Tag. However the ECC segment 107 is not predictable because it protects more than just the Cache-Tag. In particular, the ECC segment also protects segment 105 which is not predictable based on a CPU-address. The information in segment 105 is not needed to determine a cache hit. So while the Cache-Tag can be predicted (if a cache hit is to occur) based on a CPU-Tag, there is no way to assure the Cache-Tag is valid until the ECC information is checked by the ECC circuit 215. As such, the cache memory system must incur the latency through the ECC circuit 215 before a cache hit can be known.

The present invention divides the ECC segment 107 into two segments where one ECC segment protects the Cache-Tag 103 and one segment protects the unpredictable information in segment 105.

Figure 3:
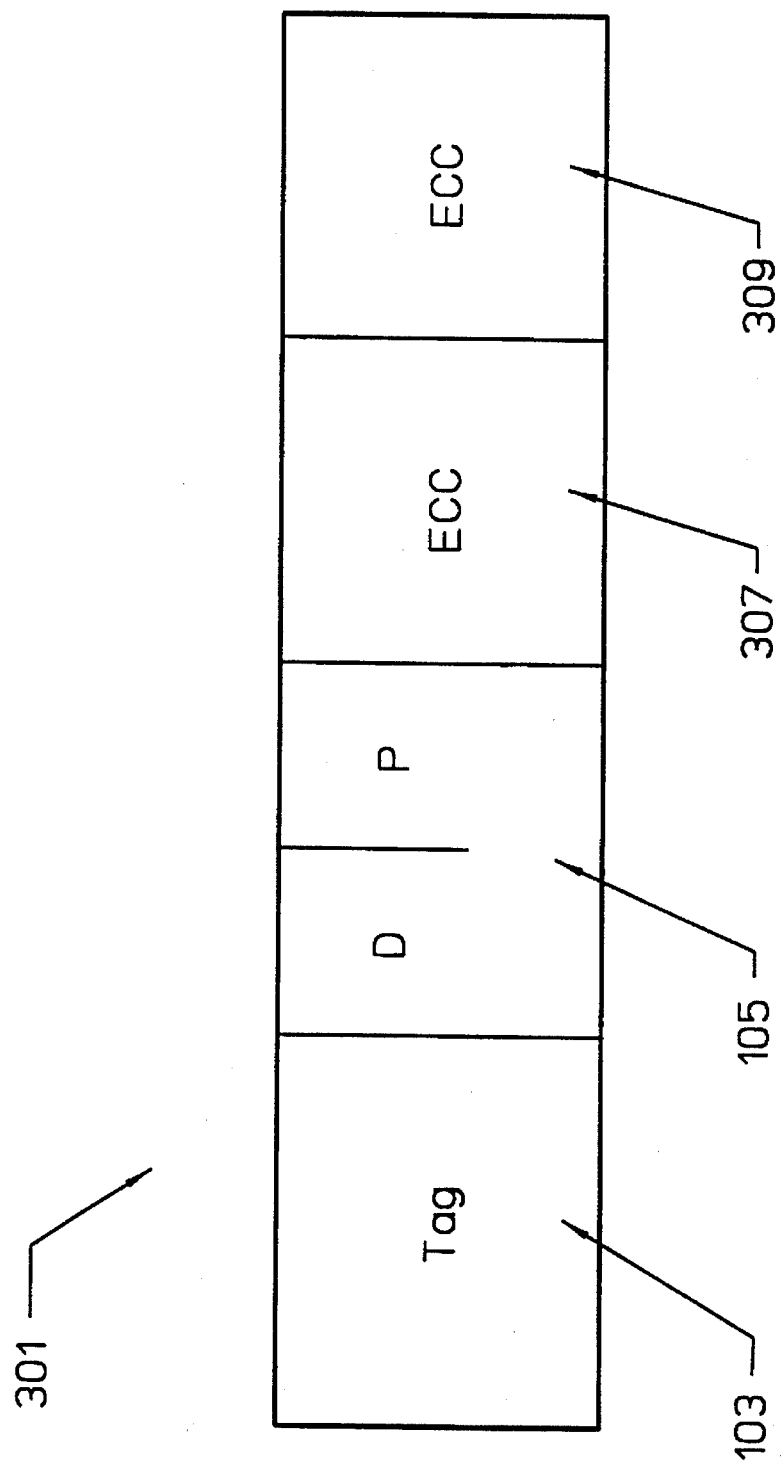
FIG. 3 illustrates a cache entry according to the present invention.

FIG. 3 illustrates a cache entry 301 according to the present invention. Segments 103 and 105 are the same as previously described. However, the ECC segment 107 in FIG. 1 has been split into two segments 307 and 309. ECC segment 307 protects the Cache-Tag 103 and ECC segment 309 protects segment 105.

Since the ECC has been split, the ECC segment 307 associated with the Cache-Tag 103 can be predicted (for a hit to occur) given a CPU-Tag This is true as the method of generating an ECC is known, so given a specific Tag, the associated ECC can be readily determined. Therefore both the Cache-Tag 103 and the associated Cache-ECC 307 can be predicted given a specific CPU-Tag, again assuming a cache hit is to occur.

Figure 4:
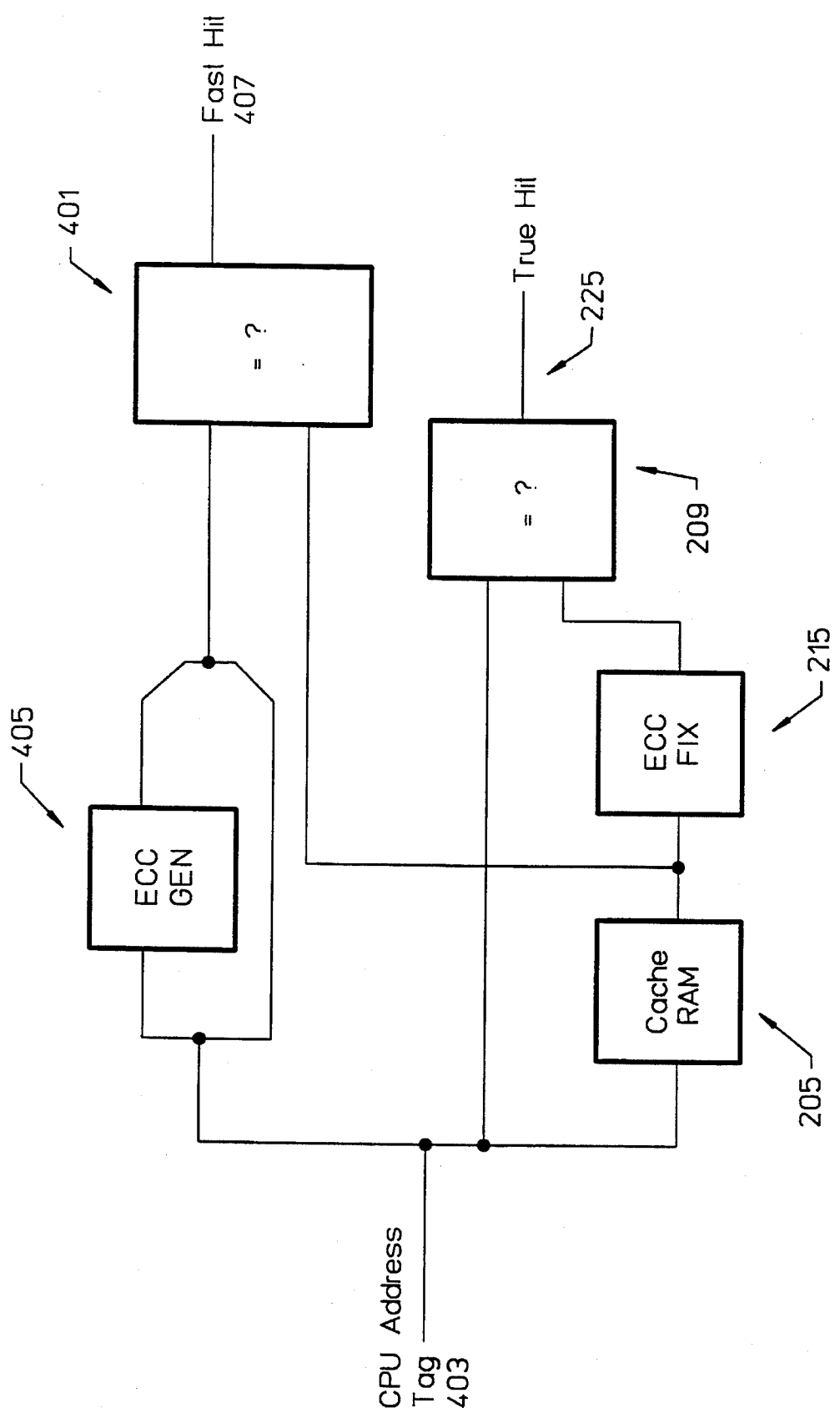
FIG. 4 illustrates a cache hit detection apparatus according to the present invention.

FIG. 4 illustrates a cache hit detection apparatus according to the present invention. The cache RAM 205, Tag check and correct circuit 215 and the Tag comparator 225 function as discussed in association with FIG. 2 and provide the same true hit output 225 as before. A second comparator 401 is provided which receives the Cache-Tag / Cache-ECC pair from the cache RAM 205. Another input of the second comparator 401 receives the CPU address Tag 403 and a derived CPU-Tag ECC generated by an ECC generator 405.

The ECC generator 405 takes the CPU-Tag and computes the appropriate ECC for that Tag in the same manner as is used to derive the Cache-ECC stored in the cache memory. This ECC generator derives the CPU-Tag ECC in the same or less time than is required to access the Cache-Tag/Cache-ECC pair from the cache RAM.

The second comparator 401 compares the Cache-Tag to the CPU-Tag and compares the derived CPU-Tag ECC to the Cache-ECC. If both the Tags and the ECCs match, then the comparator 401 outputs a fast hit signal 407. Since the ECC generator derives the CPU-Tag ECC in parallel with the cache RAM access, the time required to assert the fast hit signal is less than required to assert the true hit signal by the delay time through the Tag check and correction circuit 215 (approximately 2 ns).

Since, most of the time the cache tag does not need to be corrected and generally there is a cache hit, by using the fast hit signal, the cache memory system can supply data to the CPU in less time than the prior art designs allow. If the fast hit is not asserted, then either there is a cache miss or the Cache-Tag has an error and the cache memory system waits for the true hit/miss signal as before.

Since the error correction occurs in parallel with the fast hit detection, the true hit/miss does not happen any later than without this invention. Therefore this invention provides a significant performance improvement over the prior art for most memory operations with no penalty for those memory cycles needing Cache-Tag correction.

Other embodiments of the invention will be apparent to the skilled in the art from a consideration of this specification or practice of the invention disclosed herein. For example, while the CPU address Tag has been used directly to access the cache RAM, a hash function, or other distribution method can be used to distribute the cache RAM entries more uniformly. Also, while only a single level cache memory system has been illustrated, this invention is equally applicable to multi-level cache memory systems. As such, It is intended that the specification and examples be considered as exemplary only, with the true scope and spirit of the invention being indicated by the following claims.

I claim:

1. A computer apparatus, having a cache memory system, comprising:

a cache memory device having a first storage location and stored in the first storage location is a Cache-Tag, where the Cache-Tag includes address information, and also stored in the first storage location is a cache error correcting code (Cache-ECC) where the Cache-ECC is based on the Cache-Tag and the Cache-ECC is generated by a first ECC generator;

a second ECC generator to derives which derives a CPU-ECC for a CPU-Tag where the CPU-Tag includes address information, and the second ECC generator operates such that the first and second ECC generators derive an identical ECC given an identical Tag input;

a fast hit comparator which operates to compare the Cache-Tag stored in the first storage location and a particular CPU-Tag generated by a CPU, and the fast hit comparator operates to compare the Cache-ECC stored in the first storage location and a particular CPU-ECC generated by the second ECC generator in response to the particular CPU-Tag; and the fast hit comparator signals the cache memory system if both the Cache-Tag and the particular CPU-Tag match and the particular Cache-ECC and the CPU-ECC match.

2. An apparatus as in claim 1 wherein:

the first storage location includes at least four fields where a first field contains the Cache-Tag, a second field contains the Cache-ECC, a third field contains information used by the computer apparatus to operate the cache memory system, and a fourth field contains error correcting information based, on information in the third field.

3. An apparatus as in claim 1 wherein:

the second ECC generator generates an ECC in response to a CPU-Tag within the time required to read information from the cache memory device.

4. An apparatus as in claim 1 wherein:

the cache memory device contains a plurality of storage locations and stored in the plurality of storage locations is a plurality of Cache-Tags Cache-ECCs;

the CPU-Tag provides an index which selects a particular Cache-Tag and Cache-ECC stored in the cache memory device; and the selected Cache-Tag and Cache-ECC are compared by the fast hit comparator against the CPU-Tag and the CPU-ECC to determine whether a fast hit has occurred.

5. A computer apparatus, having a cache memory system, comprising:

a cache memory device having a first storage location and stored in the first storage location is a Cache-Tag where the Cache-Tag includes address information, and also stored in the first storage location is a cache error correcting code (Cache-ECC) where the Cache-ECC is based on the Cache-Tag and the Cache-ECC is generated by a first ECC generator;

a second ECC generator which operates to derive a CPU-ECC for a CPU-Tag where the CPU-Tag includes address information, and the second ECC generator operates such that the first and second ECC generators derive an identical ECC given an identical Tag input;

a fast hit comparator which operates to compare the Cache-Tag stored in the first storage location and a particular CPU-Tag generated by a CPU, and the fast hit comparator compares the Cache-ECC stored in the first storage location and a particular CPU-ECC generated by the second ECC generator in response to the particular CPU-Tag and the fast hit comparator signals the cache memory system if both the Cache-Tag and the particular CPU-Tag match and the Cache-ECC and the particular CPU-ECC match;

a Cache-Tag correction device which operates to receive the Cache-Tag and correct the Cache-Tag if the Cache-Tag is corrupted and output the corrected Cache-Tag to a true hit comparator; and the true hit comparator compares the corrected Cache-Tag to the particular CPU-Tag and signals the cache memory system that a cache hit has occured if the Cache-Tag and the particular CPU-Tag match.

6. An apparatus as in claim 5 wherein:

the first storage location includes at least four fields where a first field contains the Cache-Tag, a second field contains the Cache-ECC, a third field contains information used by the computer apparatus to operate the cache memory system, and a fourth field contains error correcting information based on information in the third field.

7. An apparatus as in claim 5 wherein:

the second ECC generator generates an ECC in response to a CPU-Tag within the time required to read information from the cache memory device.

8. An apparatus as in claim 5 wherein:

the cache memory device contains a plurality of storage locations and stored in the plurality of storage locations is a plurality of Cache-Tags and Cache-ECCs;

the CPU-Tag provides an index which selects a particular Cache-Tag and Cache-ECC stored in the cache memory device;

the selected Cache-Tag and Cache-ECC are compared by the fast hit comparator against the CPU-Tag and the CPU-ECC to determine whether a fast hit has occured; and the selected Cache-Tag is corrected, if required, by the Cache-Tag correction device and the corrected Cache-Tag is compared by the true hit compartor against the CPU-Tag to determine if a cache hit has occured.

* * * * *

UNITED STATES PATENT AND TRADEMARK OFFICE
CERTIFICATE OF CORRECTION

PATENT NO.    : 5,509,119                                      Page 1 of 1
DATED         : April 16, 1996
INVENTOR(S)   : La Fetra It is certified that error appears in the above-identified patent and that said Letters Patent is hereby corrected as shown below:

Column 4,
Line 59, delete "CPU-Tag" and insert therefor -- CPU-Tag. --

Column 5,
Line 58, after "generator" delete "to derives"

Column 6,
Line 13, delete "based," and insert therefor -- based --

Column 8,
Line 10, delete "compartor" and insert therefor -- comparator --

Signed and Sealed this

Twenty-second Day of July, 2003

JAMES E. ROGAN
*Director of the United States Patent and Trademark Office*